(12) United States Patent
Sawada

(10) Patent No.: US 12,076,964 B1
(45) Date of Patent: Sep. 3, 2024

(54) HYDROPHILIZED EXPANDED PTFE AND METHOD OF HYDROPHILIZING EXPANDED PTFE

(71) Applicant: SAIKYO BIOTECH CO.,LTD., Tokyo (JP)

(72) Inventor: Makoto Sawada, Tokyo (JP)

(73) Assignee: SAIKYO BIOTECH CO., LTD., Tokyo (JP)

(*) Notice: Subject to any disclaimer, the term of this patent is extended or adjusted under 35 U.S.C. 154(b) by 0 days.

(21) Appl. No.: 18/579,968

(22) PCT Filed: Jul. 6, 2023

(86) PCT No.: PCT/JP2023/025108
§ 371 (c)(1),
(2) Date: Jan. 17, 2024

(51) Int. Cl.
*B32B 27/32* (2006.01)
*B32B 27/10* (2006.01)

(52) U.S. Cl.
CPC .......... *B32B 27/322* (2013.01); *B32B 27/10* (2013.01); *B32B 2250/02* (2013.01); *B32B 2255/12* (2013.01); *B32B 2264/203* (2020.08); *B32B 2310/14* (2013.01); *B32B 2327/18* (2013.01); *B32B 2535/00* (2013.01)

(58) Field of Classification Search
None
See application file for complete search history.

(56) References Cited

U.S. PATENT DOCUMENTS

| 5,665,114 A | * | 9/1997 | Weadock | A61L 27/48 |
| | | | | 623/1.34 |
| 2007/0050007 A1 | * | 3/2007 | Kondyurin | A61L 31/048 |
| | | | | 623/1.42 |

FOREIGN PATENT DOCUMENTS

| JP | S60-72557 A | 4/1985 |
| JP | H07-178131 A | 7/1995 |
| JP | H10-244611 A | 9/1998 |
| JP | 2006-524072 A | 10/2006 |
| JP | 2015-037614 A | 2/2015 |
| JP | 2016-138188 A | 8/2016 |
| JP | 2021-168828 A | 10/2021 |

OTHER PUBLICATIONS

Tran et al., "Plasma Modification and Collagen Binding to PTFE Grafts," Journal of Colloid and Interface Science, vol. 132, No. 2, pp. 373-381. (Year: 1989).*
International Search Report and Written Opinion of the ISA dated Oct. 10, 2023 for the corresponding patent application No. PCT/JP2023/025108 with English translation of the Written Opinion.

* cited by examiner

*Primary Examiner* — Ramsey Zacharia
(74) *Attorney, Agent, or Firm* — Lucas & Mercanti, LLP

(57) ABSTRACT

A hydrophilized ePTFE sheet includes an ePTFE sheet, Japanese paper laminated on the surface of the ePTFE sheet processed with an atmospheric pressure plasma treatment, and a collagen layer applied to the surface of the Japanese paper.

4 Claims, 2 Drawing Sheets

HYDROPHILIZED EXPANDED PTFE AND METHOD OF HYDROPHILIZING EXPANDED PTFE

CROSS REFERENCE TO RELATED APPLICATION

This Application is a 371 of PCT/JP2023/025108 filed on Jul. 6, 2023, which is incorporated herein by reference.

FIELD OF THE INVENTION

The present invention relates to a hydrophilized expanded PTFE (ePTFE) sheet with high biological affinity and a method of hydrophilizing an ePTFE sheet with high biological affinity.

BACKGROUND ART

The ePTFE (expanded PTFE (polytetrafluoroethylene)) is inactive, not only thin but also lightweight, and durable; hence, the ePTFE has been used for items in a variety of fields such as ground packings, gaskets, and architectural fabrics (e.g., Patent Literature 1).

CITATION LIST

Patent Literature

Patent Literature 1: Japan Laid-open Patent Application Publication No. 2016-138188

SUMMARY OF THE INVENTION

Technical Problem

However, the ePTFE has had a drawback of difficulty in adherence to different other types of materials because of the hydrophobic property thereof.

Especially, the ePTFE has had difficulty in use for applications utilizing the biological affinity thereof such as embedment in a human body and attachment to the surface of an organ or so forth.

The present invention has been produced in view of the drawback described above; hence, it is an object of the present invention to provide not only a hydrophilized ePTFE sheet, enhanced in hydrophilic property so as to be made usable for applications such as embedment in a human body and attachment to the surface of an organ or so forth, but also a method of hydrophilizing an ePTFE sheet.

Solution to Problem

According to an aspect of the present invention, a hydrophilized ePTFE sheet is provided. The hydrophilized ePTFE sheet includes an ePTFE sheet, Japanese paper laminated on a surface of the ePTFE sheet processed with an atmospheric pressure plasma treatment, and a collagen layer applied to a surface of the Japanese paper.

Preferably, the collagen layer has a surface irradiated with an ion beam.

According to another aspect of the present invention, a method of hydrophilizing an ePTFE sheet is provided. The method includes processing a surface of the ePTFE sheet with an atmospheric pressure plasma treatment, laminating Japanese paper on the surface of the ePTFE sheet processed with the atmospheric pressure plasma treatment, and applying a collagen layer to a surface of the Japanese paper.

Preferably, the method further includes irradiating an ion beam to a surface of the collagen layer.

Effects of Invention

In the hydrophilized ePTFE sheet according to the present invention, the surface of the ePTFE sheet is processed with the atmospheric pressure plasma treatment. Then, the Japanese paper is laminated thereon. Furthermore, the collagen layer is applied to the surface of the Japanese paper. Accordingly, it is made possible to provide the ePTFE sheet enhanced in hydrophilic property on the surface thereof.

DETAILED DESCRIPTION OF EMBODIMENTS (Configuration of Hydrophilized Expanded PTFE Sheet)

Figure 1:
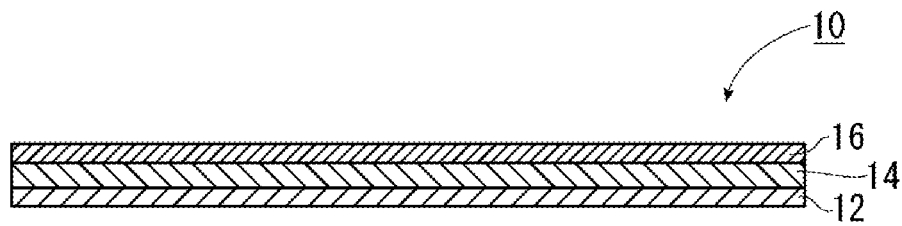
FIG. 1 is a diagram exemplifying a hydrophilized ePTFE sheet (10) according to an exemplary embodiment.

As shown in FIG. 1, a hydrophilized ePTFE sheet 10 according to the present exemplary embodiment roughly includes an ePTFE sheet 12, Japanese paper (so-called "Washi") 14, and a collagen layer 16.

It is preferable to use an ePTFE sheet with a thickness of 50 to 500 μm as the ePTFE sheet 12.

Figure 2:
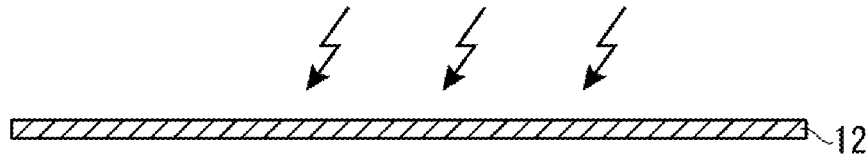
FIG. 2 is a diagram showing a process of manufacturing the hydrophilized ePTFE sheet (10)

As shown in FIG. 2, the surface of the ePTFE sheet 12 is processed with an atmospheric pressure plasma treatment. The ePTFE sheet 12 is hydrophobic but is enabled to be changed into being hydrophilic by the atmospheric pressure plasma treatment; hence, a cellulose film or so forth is enabled to be laminated on the ePTFE sheet, albeit not being adherent to the ePTFE sheet in nature. The Japanese paper 14 is a member laminated on the ePTFE sheet 12 surface processed with the atmospheric pressure plasma treatment. In the present specification, the Japanese paper 14 refers to a member obtained by putting plant-derived cellulose fiber into a polysaccharide aqueous solution, agitating the solution such that the plant-derived cellulose fiber can be homogeneously dispersed therein, and shaping the solution in membrane. Besides, it is preferable to use the member with a thickness of 10 to 100 μm as the Japanese paper 14. To obtain the Japanese paper 14, the cellulose fiber is of an ultrafine type obtained from, especially, the epidermis of plants such as *Broussonetia kazinoki* ×*B. papyrifera*, *Diplomorpha sikokiana*, or *Edgeworthia chrysantha*, whereas the polysaccharide used for suspension is obtained from *Abelmoschus manihot* or so forth and has chances of being used as a food additive as well. Because of nonuse of chemicals, the Japanese paper 14 is nonirritating to living bodies; hence, the Japanese paper 14 can be regarded as an excellent biocompatible material.

For example, the following can be assumed as a method of laminating the Japanese paper 14 on the surface of the ePTFE sheet 12. The Japanese paper 14 is heated to 100 to 200° C., while the ePTFE sheet 12 is heated to 150 to 200°

Figure 3:
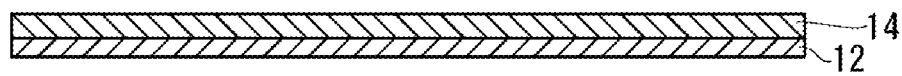
FIG. 3 is a diagram showing the process of manufacturing the hydrophilized ePTFE sheet (10)

C.; then, the Japanese paper 14 is pressurized onto the surface of the ePTFE sheet 12 at a pressure of 0.2 to 1.0 MPa (see FIG. 3).

The collagen layer 16 is a layer of a collagen solution applied to the surface of the Japanese paper 14. A type I collagen "AteloCell (Catalog No. IPC-50)", supplied by Koken Co., Ltd., can be assumed as a concrete example of the collagen solution. Besides, it is preferable for the collagen layer 16 to have a thickness of 10 to 40 μm.

For example, the following can be assumed as a method of forming the collagen layer 16. An undiluted collagen solution is diluted with purified water at 1:1 or greater dilution; then, the diluted collagen solution is homogeneously applied to the Japanese paper 14 laminated on the surface of the ePTFE sheet 12 by immersing the Japanese paper 14 into the diluted collagen solution. Thereafter, the ePTFE sheet 12 and the Japanese paper 14 are removed from the diluted collagen solution and are dried in air. The processing steps are repeated a plurality of times; then, the diluted collagen solution is dried out. Up until here, the hydrophilized ePTFE sheet 10 has been completed as shown in FIG. 1.

Figure 4:
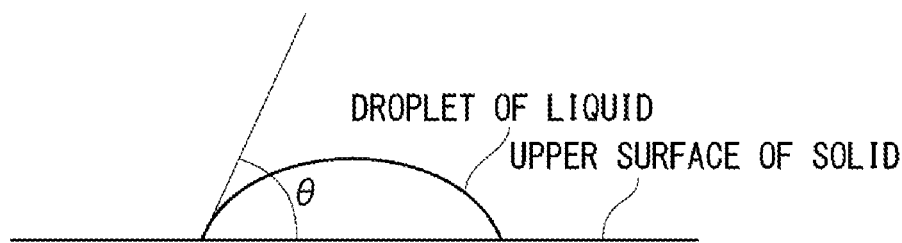
FIG. 4 is a diagram for explaining a contact angle.

Contact angles on the completed hydrophilized ePTFE sheet 10 are measured on one side that the collagen layer 16 is formed and the other side opposite to the one side; then, it is checked that the contact angle on the side that the collagen layer 16 is formed is 90° or less, while that on the opposite side is 90° or greater. It should be noted that the term "contact angle" is one of indicators for wettability assessment and is expressed by quantifying to what extent a liquid swells in the form of a droplet when dropped on a given solid. Specifically, as shown in FIG. 4, when a liquid attached to the upper surface of a solid is observed sideways, the contact angle is expressed by an angle θ measured at an end point of the liquid in the form of a droplet with reference to the surface of the solid.

Furthermore, the amount of liquid attached to the hydrophilized ePTFE sheet 10 is measured both on the side that the collagen layer 16 is formed and the opposite side thereto. Then, it is checked that the amount of liquid is 40% or less after elapse of 30 seconds on the side that the collagen layer 16 is formed, while the amount of liquid is unchanged even at and after elapse of 30 seconds on the opposite side.

(Modification 1)

In the exemplary embodiment described above, the hydrophilized ePTFE sheet 10 is completed by forming the collagen layer 16 on the surface of the Japanese paper 14; furthermore, the surface of the collagen layer 16 may be irradiated with an ion beam or either electromagnetic waves or an electron beam.

Figure 5:
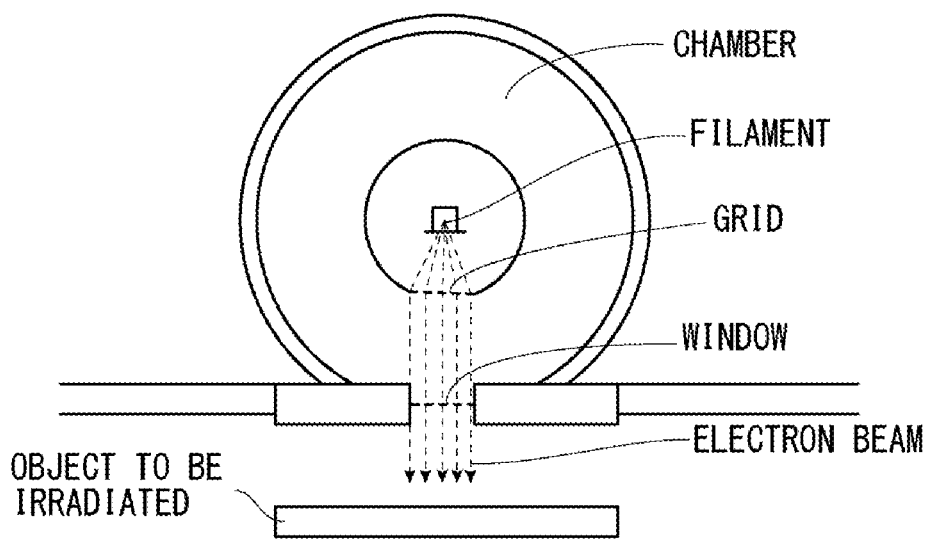
FIG. 5 is a diagram exemplifying the principle of electron beam irradiation.

The principle of electron beam irradiation (of a thermionic type) will be briefly explained with FIG. 5. A tungsten filament, disposed in the center of a chamber kept in a vacuum state, is electrified; accordingly, the tungsten filament is heated and releases thermions. First, the released thermions are extracted by a grid. Thereafter, the thermions are accelerated to approach the speed of light by a high voltage (acceleration voltage) of 80 to 300 kV applied between a terminal and a window serving as an anode and take the form of electron current. The thermions then penetrate a thin foil (made of aluminum or titanium) in the window and jump outside as an electron beam. The electron beam is utilized in the electron beam irradiation.

Figure 6:
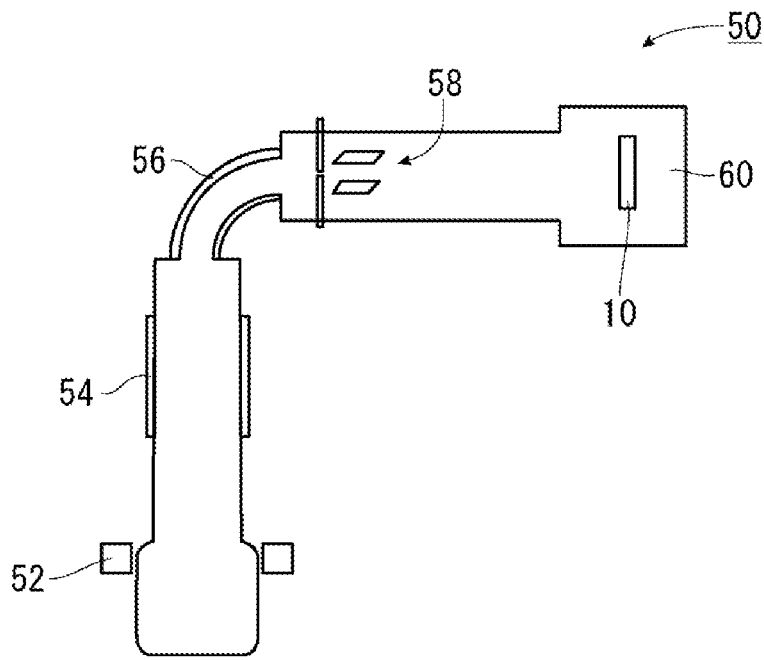
FIG. 6 is a diagram exemplifying ion beam irradiation.

Ion beam irradiation will be briefly exemplified. As shown in FIG. 6, an exemplary ion beam irradiating apparatus 50 includes an ion source 52, an ion accelerating tube 54, a mass analyzer 56, a scanner 58, and a sample chamber 60.

First, the ePTFE sheet 10, provided with the collagen layer 16 formed on the surface of the Japanese paper 14, is disposed in the sample chamber 60 as a sample to be irradiated with an ion beam. Thereafter, ions are generated by the ion source 52 and are then accelerated by an electric field in the ion accelerating tube 54. Among the accelerated ions, only those with a mass necessary for irradiation are selected by the mass analyzer 56. The selected ions are irradiated by the scanner 58 so as to scan the entirety of the ePTFE sheet 10. It should be noted that a voltage of 50 to 200 KeV is applied in the ion accelerating tube 54, while a negative pressure of 104 to 105 Pa is applied in the sample chamber 60.

When it comes to the hydrophilized ePTFE sheet 10 completed by forming the collagen layer 16 on the surface of the Japanese paper 14, the hydrophilized ePTFE has been unsuitable for use in a likely position for blood adherence, because platelets in blood have properties of being likely to adhere to the surface of the collagen layer 16. However, when the surface of the collagen layer 16 is irradiated with an ion beam or either electromagnetic waves or an electron beam, blood platelets become unlikely to be adhered to the surface of the collagen layer 16; hence, the hydrophilized ePTFE sheet 10 irradiated with an ion beam is enabled to be actively used in the likely position for blood adherence.

It should be understood that the embodiments herein disclosed are illustrative only and are not restrictive in all aspects. It is intended that the scope of the present invention is indicated by the appended claims rather than the explanation described above and encompasses all the changes that come within the meaning and the range of equivalents of the appended claims.

REFERENCE SIGNS LIST

10 . . . . Hydrophilized ePTFE sheet, 12 . . . ePTFE sheet, 14 . . . . Japanese paper, 16 . . . . Collagen layer, 50 . . . . Ion beam irradiating apparatus, 52 . . . . Ion source, 54 . . . . Ion accelerating tube, 56 . . . . Mass analyzer, 58 . . . . Scanner, 60 . . . . Sample chamber

What is claimed is:

1. A hydrophilized ePTFE sheet comprising:
   an ePTFE sheet;
   Japanese paper laminated on a surface of the ePTFE sheet processed with an atmospheric pressure plasma treatment; and
   a collagen layer applied to a surface of the Japanese paper.

2. The hydrophilized ePTFE sheet according to claim 1, wherein the collagen layer has a surface irradiated with an ion beam.

3. A method of hydrophilizing an ePTFE sheet, the method comprising:
   processing a surface of the ePTFE sheet with an atmospheric pressure plasma treatment;
   laminating Japanese paper on the surface of the ePTFE sheet processed with the atmospheric pressure plasma treatment; and
   applying a collagen layer to a surface of the Japanese paper.

4. The method according to claim 3, further comprising: irradiating an ion beam to a surface of the collagen layer.

* * * * *